United States Patent [19]
Sawada et al.

[11] Patent Number: 5,672,822
[45] Date of Patent: Sep. 30, 1997

[54] THERMAL FLOW METER WITH LESS TURBULENCE IN FLUID FLOW

[75] Inventors: Yukio Sawada, Anjo; Yukio Mori; Ryo Nagasaka, both of Nagoya; Tomoyuki Takiguchi, Obu, all of Japan

[73] Assignee: Nippondenso Co., Ltd., Kariya, Japan

[21] Appl. No.: 787,372

[22] Filed: Jan. 22, 1997

Related U.S. Application Data

[63] Continuation of Ser. No. 465,099, Jun. 5, 1995, abandoned.

[30] Foreign Application Priority Data

Jun. 23, 1994 [JP] Japan .................. 6-141578

[51] Int. Cl.$^6$ .................................................. G01F 1/68
[52] U.S. Cl. .................. 73/202.5; 73/204.21; 73/118.2
[58] Field of Search ......................... 73/202.5, 204.21, 73/118.2

[56] References Cited

U.S. PATENT DOCUMENTS

| | | | |
|---|---|---|---|
| 4,210,016 | 7/1980 | Peter et al. | |
| 4,395,907 | 8/1983 | Morita et al. | 73/202 |
| 4,723,443 | 2/1988 | Usui et al. | 73/118.2 |
| 4,793,176 | 12/1988 | Sato et al. | 73/118.2 |
| 4,887,577 | 12/1989 | Arai et al. | 123/494 |
| 5,186,044 | 2/1993 | Igarashi et al. | |
| 5,209,113 | 5/1993 | Sawada et al. | 73/202.5 |
| 5,485,746 | 1/1996 | Mori et al. | 73/202 |
| 5,537,870 | 7/1996 | Zurek et al. | 73/202 |

FOREIGN PATENT DOCUMENTS

| | | | |
|---|---|---|---|
| 3233168 | 10/1991 | Japan . | |
| 5164585 | 6/1993 | Japan . | |
| 5322623 | 12/1993 | Japan . | |
| 6-18302 | 1/1994 | Japan | 73/202.5 |
| 6-18301 | 1/1994 | Japan | 73/202.5 |

*Primary Examiner*—Richard Chilcot
*Assistant Examiner*—Paul D. Amrozowicz
*Attorney, Agent, or Firm*—Cushman, Darby & Cushman IP Group of Pillsbury Madison & Sutro LLP

[57] ABSTRACT

A central member of a sensor unit is inserted through a sensor unit mounting hole of a cylindrical body having a main passage and the sensor unit is assembled on the cylindrical body. The sensor unit comprises the central member which is provided at the center of the main passage and has internally a bypass passage, a flow sensor provided in the bypass passage, a rib which supports the central member, a mounting section which secures the rib to the cylindrical body, an electronic circuit assembled on the rib, and a connector section retaining terminals being connected electrically to the electronic circuit section. Positioning, mounting and securing of the flow sensor can be made simultaneously by a simple process to insert the sensor sensor unit through the hole. Turbulence, eccentricity and others in the upstream air are reduced so that the flow rate of a highly rectified fluid can be measured.

19 Claims, 6 Drawing Sheets

THERMAL FLOW METER WITH LESS TURBULENCE IN FLUID FLOW

This is a continuation of application Ser. No. 08/465,099, filed on Jun. 5, 1995, which was abandoned.

CROSS REFERENCE TO RELATED APPLICATION

This application is based on and claims priority of Japanese Patent Application No. 6-141578 filed on Jun. 23, 1994, the content of which is incorporated herein by reference.

BACKGROUND OF THE INVENTION

1. Field of the Invention

The present invention relates to a thermal flow meter and more particularly is concerned with a flow meter which is less susceptible to a flow turbulence and has a sensor unit to facilitate the assembly in a compact size.

2. Description of the Related Art

As to flow meters used to measure the amount of air sucked into vehicle's engines, such air flow meters as a movable vane type, a Karman vortex type, thermal type and the like are known. Conventional thermal type air flow meters had a problem that the size becomes larger so much as it is inadequate to be mounted in an engine compartment because a sensor control electronic circuit is provided outside the body of the flow meter.

However, a thermal flow meter was recently proposed in which a functional section integrating an electronic circuit and a sensor section is disposed within a flow passage of the thermal flow meter in order to reduce the size. In such a conventional thermal flow meter, since it relies on a method that the flow rate or amount in a bypass passage is measured by a comparatively small sensor in order to monitor the overall flow rate through a main passage and the bypass passage, it is necessary to rectify eccentricity, turbulence and others in the air flow upstream of the sensor.

Where the sensor is provided in the main passage in the a conventional thermal flow meter, the pursuit to reduce size is hindered because it is necessary to provide a dedicated flow duct having a rectifying mechanism such as honeycomb or the like. Where the sensor is provided in the bypass passage, on the other hand, there also is a problem that the measurement is susceptible to the influence of eccentricity in the flow from upstream because the entrance of the bypass passage is eccentric or exit of bypass passage is opened at a part at the vicinity of wall surface.

SUMMARY OF THE INVENTION

It is, therefore, an object of the present invention to provided a thermal flow meter which is less susceptible to the influence of eccentricity or turbulence in the upstream air flow upstream of the sensor and adaptable to the need of reduced size.

It is another object of the present invention to provide a thermal flow meter which can be easily installed on a cylindrical body which has a main flow passage.

According to a thermal flow meter of the present invention comprises a cylindrical body having a main passage to flow a fluid therethrough and a sensor unit mounting hole, and a sensor unit. The sensor unit includes a central member located at the center of the main passage, having an internal bypass passage and having a gradually increasing diameter, a flow sensor provided in the bypass passage, a rib supporting the central member, a mounting section to secure the rib to the cylindrical body, an electronic circuit installed at the mounting section or the rib, and a connector section retaining terminals electrically connected to the electronic circuit. The sensor unit is assembled on the cylindrical body in a manner that the central member can be inserted in the main passage through the sensor unit mounting hole of the cylindrical body. Preferably the cylindrical body has a second cylindrical body which has an insert hole orthogonal to the main passage and the sensor unit is inserted and assembled in the insert hole of the second cylindrical body. Further, the bypass passage is shaped to return in an upstream direction and opens into the main passage in a form of letter C at a portion where the diameter of the central portion increases.

According to this structure, flow detecting section can be positioned and mounted/secured simultaneously in a simple operation to insert the sensor unit through the sensor unit mounting hole of the cylindrical body and assemble it in the main passage. Further, the exit opening is in the form of letter C.

Preferably, the central member is made to resemble a shell of which, at the center of the main passage, the outer wall gradually expands toward the downstream of the main passage.

According to this preferred structure, since the central member having a small air resistance and positioned at the center of the main passage is provided upstream of the flow detecting section and the flow detecting section is positioned in the bypass passage which is formed in the central member, the flow rate is measured on a fluid which is highly rectified after reducing turbulence, eccentricity and the like in air at the upstream of the flow detecting section so that a highly accurate measurement of flow rate is achieved.

Preferably, a suction air temperature sensor is secured on the sensor unit and positioned in the main passage in a state that the sensor unit is assembled by being inserted and assembled in the cylindrical body. The output terminals of the suction air temperature sensor are provided on the connector section integral with output terminals of flow rate signal of the flow meter.

According to this preferred structure, since the suction air temperature sensor is assembled on the sensor unit which is equipped with the flow detecting section to measure the flow rate, the flow detecting section and the suction air temperature detecting section can be integrated to improve the assembly efficiency.

Preferably, the cylindrical body is cast integrally as a part of air cleaner housing or a part of throttle body. The cylindrical body is a duct with a suction air passage.

According to this preferred structure, such components which comprises engine's suction air system, as an air cleaner, throttle body or duct can be utilized to insert the sensor unit so that the sensor unit can be integrated to such component and thus there is an advantage that the engine's suction air system is assembled easily.

DETAILED DESCRIPTION OF THE PREFERRED EMBODIMENTS

Referring to the accompanying drawings, various embodiments are described blow.

(First embodiment)

Figure 1:
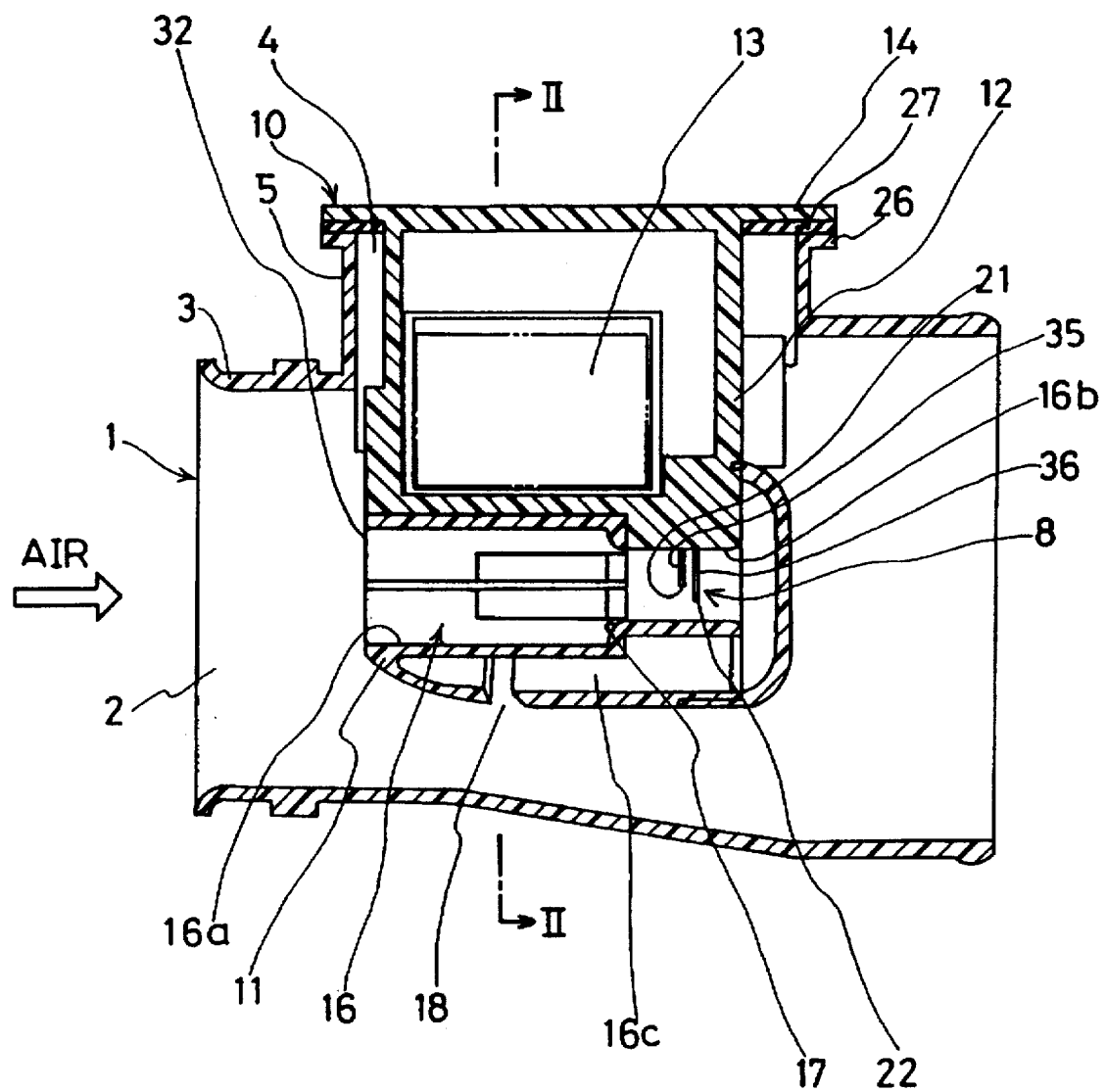
FIG. 1 is a cross sectional view illustrating a thermal flow meter of a first embodiment according to the present invention.
Figure 2:
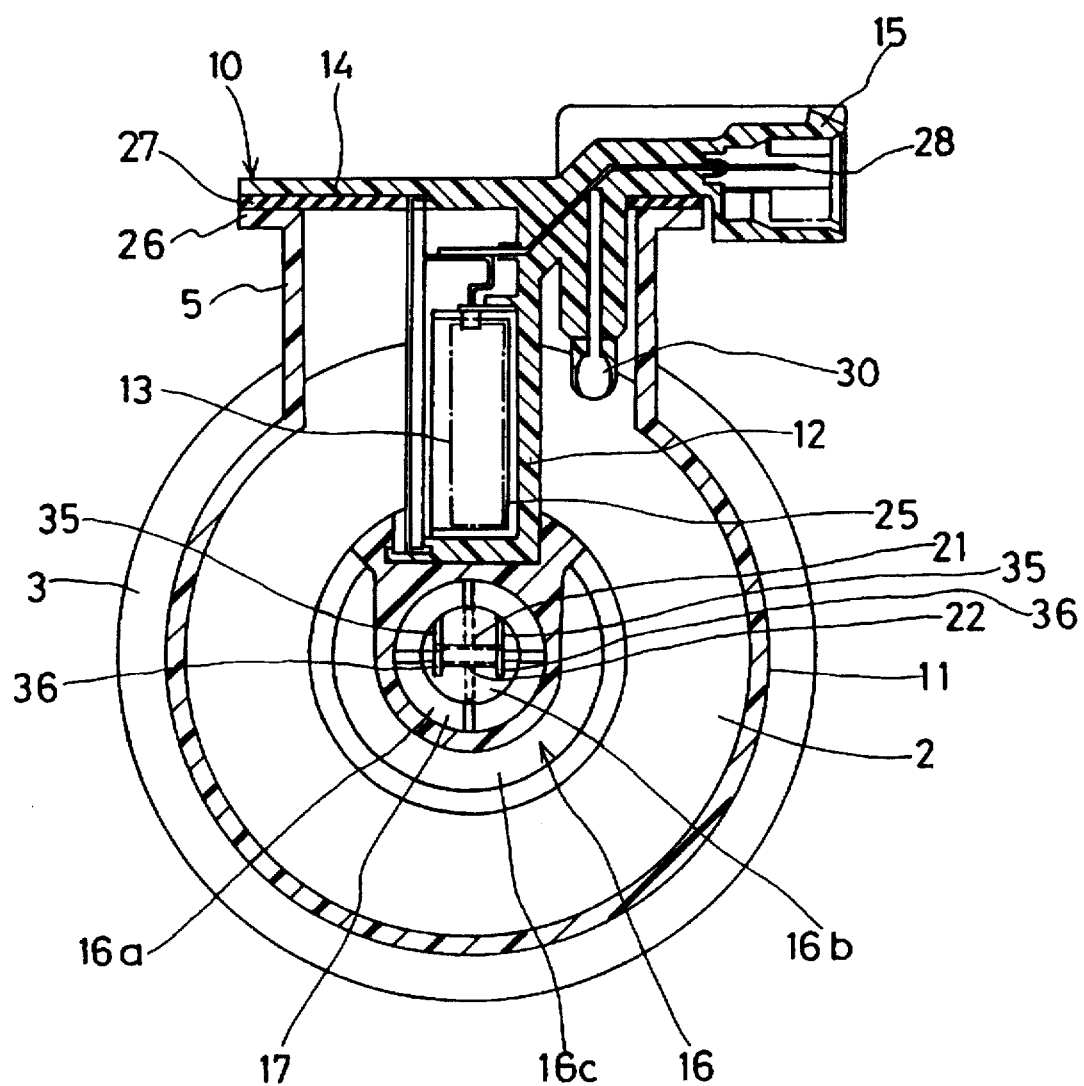
FIG. 2 is a cross sectional view taken along the line II—II in FIG. 1.

A first embodiment according to the present invention is directed to a thermal flow meter which measures air amount sucked into an engine, which is provided in a duct with a suction air passage formed at the downstream of an air cleaner element. As shown by FIG. 1 and FIG. 2, a sensor unit 10 which constitutes the principal part of the thermal flow meter, is installed on a duct 1.

Duct 1 comprises first cylindrical body 3 having main passage 2 and a second cylindrical body 5 having a hole 4 to insert the sensor unit 10. These first cylindrical body 3 and second cylindrical body 5 are cast with resin as an integral component.

Sensor unit 10 is assembled and secured to the second cylindrical body 5. The sensor unit 10 constitutes a major part of the thermal flow meter and comprises a central member 11 located at the center of a main passage 2 in assembled state, a flow detecting section 8 to measure air flow rate, a rib 12 supporting the central member 11 in the main passage 2, an electronic circuit 13 fixed to the rib 12 and controlling and processing signals from the flow detecting section 8, a mounting section 14 to secure the sensor unit 10 to the duct 1, and a mechanical connector section 15 to provide an electrical connection.

The central member 11 has a profile of a shell of which the shape its outside diameter gradually extends toward the downstream. The central member 11 is provided at the central part of first cylindrical body 3 in a manner that the cross section of passage of main passage 2 which is formed around the periphery of the central member 11. Bypass passage 16, which is provided in the central member 11, has a large diameter passage 16a at the upstream side, a small diameter passage 16b at the downstream side and a step section 17 inbetween. Area of the bypass passage at the downstream formed by the small diameter passage 16b is smaller than the area of the bypass passage which is formed by the large diameter passage 16a at the upstream of the step 17. The bypass passage 16 turns around at the downstream side of the flow detecting section 8 and bypass passage 16c which has a cross section resembling a letter C, turns around and returns to the upstream side, forms a bypass exit section 18 around the external periphery of the central member 11 at the upstream side of the flow detecting section 8 and, at the bypass exit section 18, the bypass passage 16 and the main passage 2 are connected. The bypass exit section 18 opens, as shown by FIG. 2, over nearly entire periphery of the bypass passage 16b excluding the section the rib 12 is formed.

The flow detecting section 8 has a flow measuring resistor 21 and a temperature compensating resistor 22 which are disposed in the small passage 16b and supported by insulating supports 35 and 36 perpendicularly against the flow direction of the small diameter passage 16b.

The rib 12 supports the central member 11 so as to dispose it approximately at the center of the main passage 2. The rib 12 is inserted in the hole 4 of second cylindrical body 5 in the opening direction or vertically in FIGS. 1 and 2.

The mounting section 14 is a part which secures the central member 11, rib 12, electronic circuit 13 and connecter section 15 to the duct 1, and secured to a flange 26 of second cylindrical body 5 of the first cylindrical body 3 through a gasket 27. It means that, by simply securing the mounting section 14 of the sensor unit 10 to the second cylindrical body 5, the central member 11 retained against the rib 12 by the mounting section 14 can be disposed approximately at the center of the main passage 2. In other words, by inserting for assembly the sensor unit 10 in the opening of second cylindrical body 5 formed on the duct 1, the flow detecting section 8 of the thermal flow meter can be assembled and disposed.

The electronic circuit 13 has a control electronic circuit which is not shown in FIGS. 1 and 2 but connected electrically to the flow measuring resistor 21 and the temperature compensating resistor 22, and the control electronic circuit is, in turn, accommodated in a electronic circuit case 25 which is further secured to the side wall of the rib 12.

The connector section 15 is a part to secure terminals 28 which are electrically connected to the electronic circuit 13, and is cast with resin integrally with the mounting section 14. In addition, approximately at the connector 15, a suction air temperature sensor 30, which is cast with the insert casting integrally with the mounting section 14 and the connector section 15, is provided at the side of the rib 12. The suction air temperature sensor 30 is, in the assembled state, exposed to air flowing through the main passage 2.

In the first embodiment, the thermal flow meter can be assembled completely by simply inserting for assembly the sensor unit 10 into the hole 4 of second cylindrical body 5 formed perpendicularly to the first cylindrical body 3. In other words, since the assembly of sensor can be completed only by engaging fixedly the sensor unit 10 in the fluid flowing passage, the flow meter can be assembled easily.

Next, operation of the first embodiment according to embodiment is described.

In FIG. 1, air sucked through an air cleaner which is assembled at the upstream side of duct 1 but not shown, is introduced in the main passage 2 and flows from left to right in the main passage 2 in FIG. 1. In this case, since the area of the main passage is choked by the central member 11, flow speed in the main passage 2 increases, a negative pressure generates at the bypass exit 18 and, according to the differential pressure between the negative pressure and the pressure at bypass entrance 32 of bypass passage 16 raises an air flow in the bypass passage 16. In the known manner, flow measuring resistor 21 disposed in the bypass passage 16 is heated by the electronic circuit 13 to certain differential temperature relative to suction air temperature and measures the air flow in the bypass passage 16. Consequently, the mass of suction air is detected.

Since the bypass entrance 32 which forms the bypass passage 16, is positioned approximately at the center of the main passage 2, turbulence of air flowing through the bypass passage 16 is smaller compared with turbulence in air coming from the upstream. Since there is the step 17 at the upstream side of the flow detecting section 8 in the bypass passage 16, flow from the upstream is choked and rectified at the step 17. In addition, since the bypass exit 18 opens approximately in a letter C shape over nearly entire periphery of the bypass passage 16 excepting the section of rib 12 producing an effect to rectify an eccentricity in the flow, the flow speed in the bypass passage 16 becomes uniform and is not susceptible to an eccentricity in the flow from upstream and, at the same time, the outside diameter of the central member 11 gradually expands or increases toward the downstream or, in other words, the exit opens to an area where the flow will not be scaled off, there will neither be a change in the flow rate in the bypass passage nor a change in the ratio of flow rate between the main passage 2 and the bypass passage 16.

Further, in this embodiment, since the electronic circuit 13 which has the electronic circuit is placed and exposed in the main passage 2 and at the same time at the choked section on the main passage 2 by the central member 11, cooling effect of the electronic circuit 13 is enhanced by the suction air flowing through the main passage 2 and consequently an adverse influence on the accuracy caused by a heat-up of the electronic circuit is prevented. Therefore, the flow rate is measured with a high accuracy.

Still further, according to the embodiment, the assembly can be completed in a simple process to engage the sensor unit 11 in the duct 1. Moreover, size of the flow meter itself can be reduced because the mounting section has a feature that the flow detecting section 8 is inserted, assembled and secured in the hole 4 opened at a part of the duct 1.

(Second Embodiment)

Figure 3:
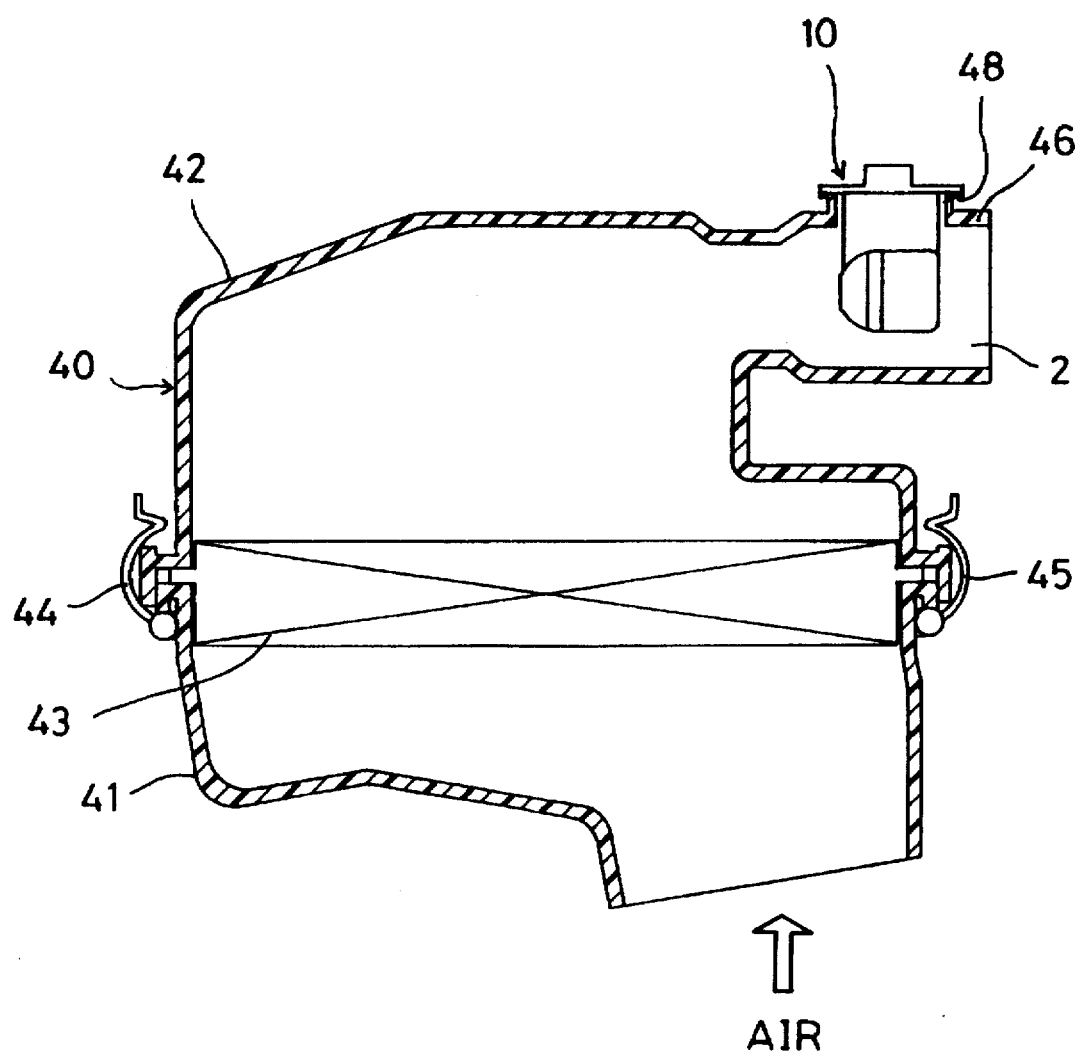
FIG. 3 is a cross sectional view of a thermal flow meter of a second embodiment according to the present invention.
Figure 4:
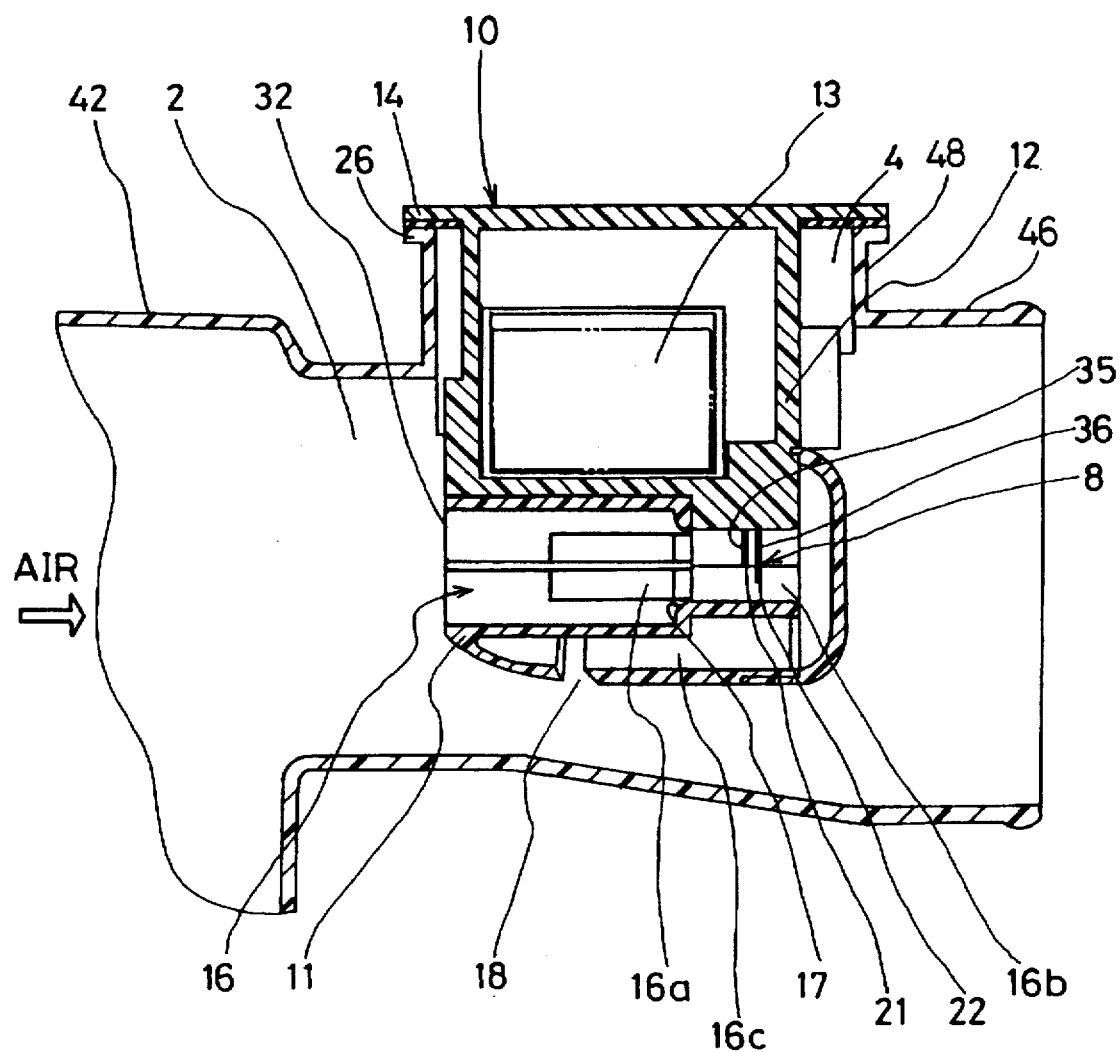
FIG. 4 is a partial enlarged cross sectional view of FIG. 3.

Second embodiment according to the present invention is illustrated in FIG. 3 and FIG. 4. Second embodiment illustrated in FIG. 3 and FIG. 4 is an example of a thermal flow meter which is mounted on an air cleaner housing.

In FIG. 3, an air cleaner 40 comprises an entrance air cleaner housing 41 and an exit air cleaner housing 42 and an air cleaner main unit 43 is clamped to the connecting section of these two housings with fixtures 44 and 45. Second cylindrical body 48 is cast integrally with an external part of cylindrical body 46 formed at the exit of the exit air cleaner housing 42 and the sensor unit 10 which is referred to in the first embodiment is inserted, assembled and secured to the opening of the cylindrical body 48.

As shown by FIG. 4, in the assembled state, the central member 11 is positioned approximately at the center of the main passage 2 formed in the cylindrical body 46. Any other construction of the sensor unit 10 is identical with FIG. 1 and so same numerals are given to the same sections and detailed description is abbreviated.

According to the second embodiment, where the sensor unit 10 is mounted on the second cylindrical body 48 of the exit air cleaner housing 42, the air flow passing through the entrance air cleaner housing 41 generates eccentricity and turbulence by the effect of folded shape of air filter element and complicated form of flow passage in the air cleaner on the way to the exit section, however, such eccentricity and turbulence in the air flow is made uniform according to the above-mentioned rectifying mechanism of the sensor unit 10. Therefore, the air flow rate can be measured with a high accuracy. Further, since it does not need such a rectifying member as a honeycomb or the like, an increase in pressure loss caused by the honeycomb and the like is prevented.

(Third Embodiment)

Figure 5:
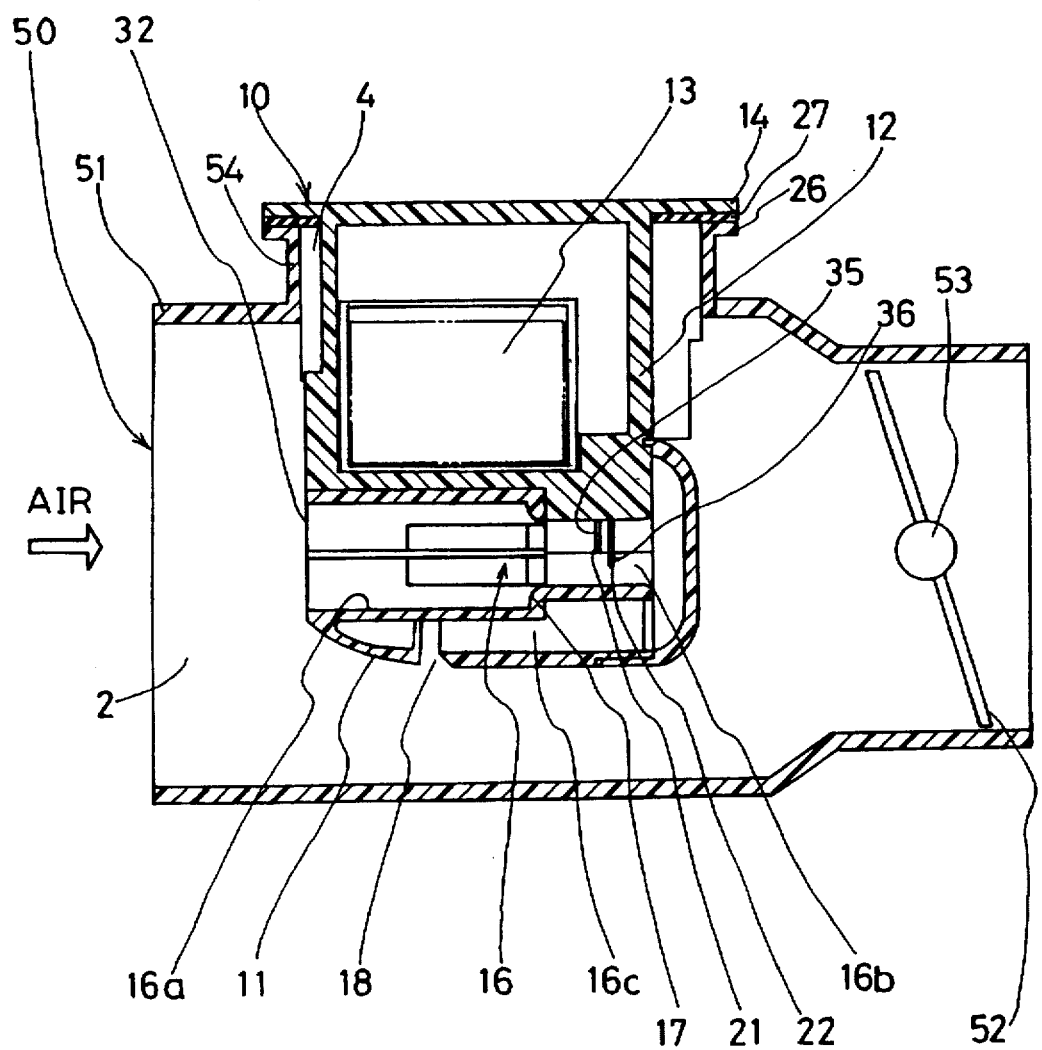
FIG. 5 is a cross sectional view of a thermal flow meter of a third embodiment according to the present invention.

Third embodiment according to the present invention is illustrated in FIG. 5. The third embodiment shown by FIG. 5 is an example in which the thermal flow meter is installed at the upstream side of a throttle valve of a throttle body.

A throttle body 50 is a cylindrical body with the internal main passage 2 and a rotary throttle valve 52 is provided around a shaft 53 at the exit section. Sensor unit 10 is installed in a manner that the central member 11 is positioned approximately at the center of main passage 2 at the upstream of throttle valve 52. The sensor unit 10 is inserted and assembled in the hole 4 of second cylindrical body 54 which is cast integrally with first cylindrical body 51 formed on the throttle body 50. The sensor unit 10 is constructed in the same way as illustrated in FIG. 1 and so description of the construction, operation and effect are abbreviated.

In the third embodiment, since the sensor unit 10 is assembled on the throttle body at the upstream of the throttle valve 52, bypass exit 18 is opened approximately over entire periphery around the center of main passage 2 located at the upstream of throttle valve 52. Consequently, even if flow speed distribution in the main passage 2 changes, a highly accurate measurement can be achieved notwithstanding such influence.

(Fourth Embodiment)

Figure 6:
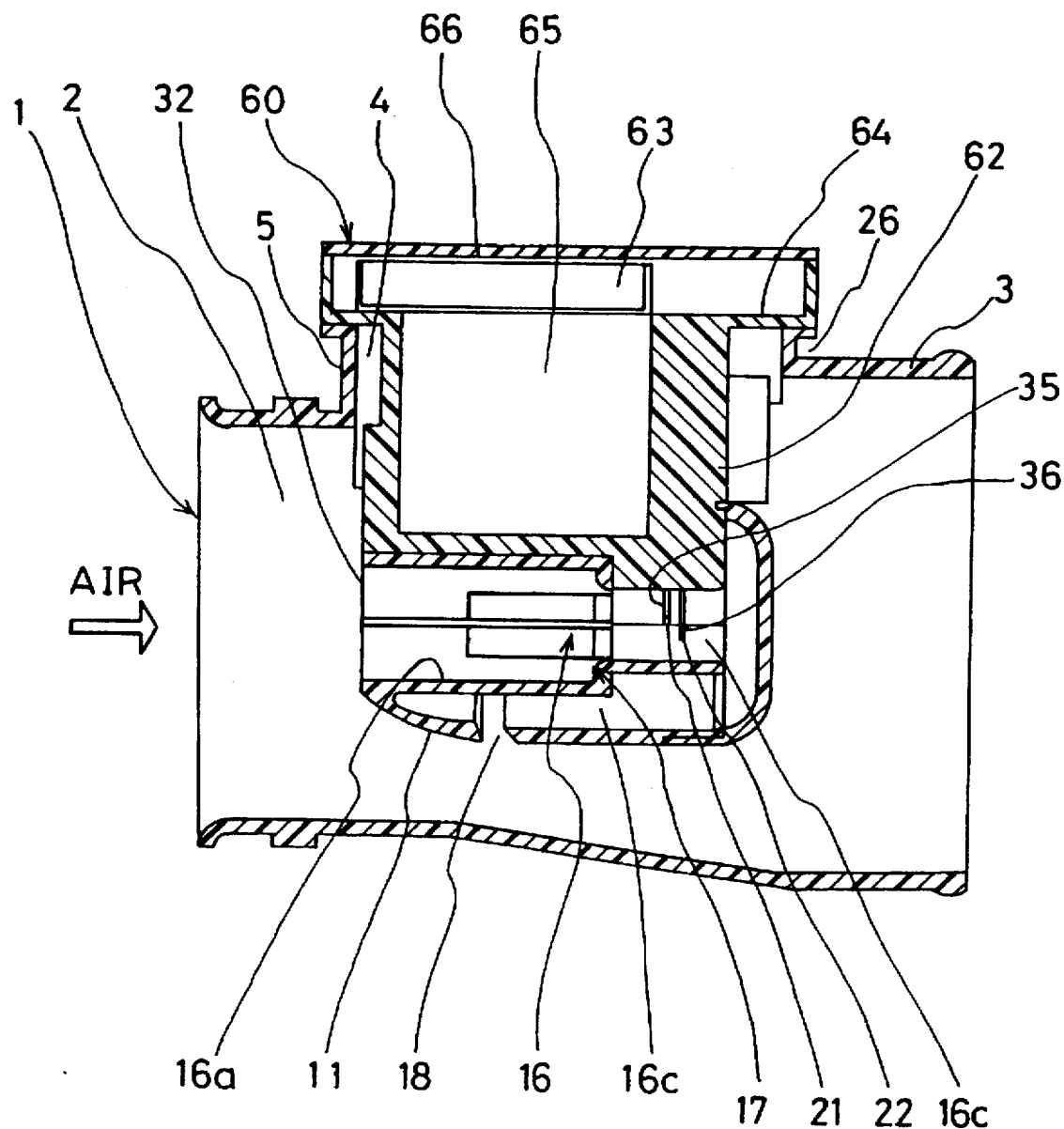
FIG. 6 is a cross sectional view of a thermal flow meter of a fourth embodiment according to the present invention.

Fourth embodiment according to the present invention is illustrated in FIG. 6. The fourth embodiment shown by FIG. 6 is an example of thermal flow meter in which the electronic circuit is positioned at the other area.

The sensor unit 60 comprises the central member 11, a supporting rib 62 to dispose the central member 11 at the center of main passage 2, an electronic circuit 63 mounted at a radially external duct end of rib 62, a mounting section 64 inserting and assembling the rib 62 in the hole 4 of the second cylindrical body 5 and a connector section which is not shown. The rib 62 has a hollow section 65 at the inside, which is formed by a casting process during manufacture and effective to reduce weight of the sensor unit 60.

The mounting section 64 is welded to a flange 26 of second cylindrical body 5 and the electronic circuit 63, with its front facing sidewise, is disposed at outside of first cylindrical body 3. A cover 66 is installed to accommodate the electronic circuit 63 in a space made by the mounting section.

According to the fourth embodiment, the electronic circuit 63 which is installed horizontally with its front part facing sidewise is provided in place of the electronic circuit 13 disposed vertically in the longitudinal direction in the first embodiment. The fourth embodiment is an example of variation in the way of installation of the electronic circuit. Any other operation and effect are the same as in the first embodiment.

It should be noted that the thermal flow meter according to the present invention is not limited to the application to flow meters to measure the suction air flow in an engine but also can be applied to other fluid measuring devices.

What is claimed is:

1. A thermal flow meter comprising:

a cylindrical body forming a main passage through which a fluid passes and an opening on a wall thereof;

a central member insertable through said opening and positioned approximately at a radial center of said main passage;

a rib connected to one part of said central member at one end thereof, said rib having an upstream end in line with an upstream end of said central member; and a mounting section connected to an other end of said rib and mounted on said cylindrical body to close said opening, wherein said central member has a profile which provides a cross section of flow passage relative to said cylindrical body, said cross section decreasing gradually toward a downstream of said main passage; and wherein said central member includes:
an introduction inlet introducing thereinto a part of a fluid flowing in said main passage;
a bypass passage the through which the fluid introduced through said introduction inlet flows;
a sensor disposed in said bypass passage for measuring a flow amount of the fluid in said bypass passage; and
an exit opened in a shape of a letter C on an outermost wall of said central member except for said one part to which said rib is connected for reverting the fluid flowing in said bypass passage to said main passage;
wherein said exit has two circumferential ends which cover said one part of said central member therebetween and generally correspond to said opening of said cylindrical body, and
wherein said exit is formed at a position between upstream and downstream ends of said rib.

2. A thermal flow meter according to claim 1,
wherein said central member is formed like a shell with an outside diameter thereof gradually increasing in an upstream to downstream direction, and
wherein said exit is formed at a position between upstream and downstream ends of said rib.

3. A thermal flow meter according to claim 2,
wherein said bypass passage includes a first passage communicated with said introduction inlet and a second passage communicated with said first passage and said exit, said second passage flowing fluid in a direction opposite to a flow direction in said first passage, and
wherein said exit is formed at a portion where the outside diameter increases.

4. A thermal flow meter according to claim 3,
wherein said sensor includes a sensing element exposed in a downstream portion of said first passage.

5. A thermal flow meter according to claim 1, further comprising:
an electronic circuit supported by said rib at a portion above said central member and exposed to said main passage, said electronic circuit being operatively connected to said sensing element.

6. A thermal flow meter according to claim 1,
wherein said cylindrical body is formed integrally with an air cleaner of an internal combustion engine.

7. A thermal flow meter according to claim 1,
wherein said cylindrical body is formed integrally with a throttle body of an internal combustion engine.

8. A thermal flow meter as in claim 1, wherein only a single rib is connected to said central member, said single rib being provided at only a single radial location connected to only a single radial location of said central member and wherein an electronic circuit is provided within said single rib.

9. A thermal flow meter comprising:
a cylindrical body forming a main passage through which a fluid passes and an opening on a wall thereof;
a central member insertable through said opening and positioned approximately at a radial center of said main passage;
a rib connected to one part of said central member at one end thereof, said rib having an upstream end in line with an upstream end of said central member; and
a mounting section connected to an other end of said rib and mounted on said cylindrical body to close said opening, wherein said central member has a profile which provides a cross section of flow passage relative to said cylindrical body, said cross section decreasing gradually toward a downstream of said main passage; and
wherein said central member includes:
an introduction inlet introducing thereinto a part of a fluid flowing in said main passage;
a bypass passage the through which the fluid introduced through said introduction inlet flows;
a sensor disposed in said bypass passage for measuring a flow amount of the fluid in said bypass passage; and
an exit opened in a shape of a letter C on an outermost wall of said central member except for said one part to which said rib is connected for reverting the fluid flowing in said bypass passage to said main passage;
wherein said bypass passage includes a first passage communicated with said introduction inlet, and a second passage communicated with a downstream portion of said first passage and said exit and generally surrounding said first passage so that fluid flows in opposite directions in said first passage and said second passage, and
wherein said exit is formed at a position between upstream and downstream ends of said rib,
wherein said exit has two circumferential ends which cover said one part of said central member therebetween and generally correspond to said opening of said cylindrical body.

10. A thermal flow meter as in claim 9, wherein only a single rib is connected to said central member, said single rib being provided at only a single radial location connected to only a single radial location of said central member and wherein an electronic circuit is provided within said single rib.

11. A thermal flow meter for use with a cylindrical body having a predetermined opening on a cylindrical wall thereof, said meter comprising:
a central member having an outer wall constructed to be inserted into said cylindrical body radially through said opening;
a rib connected to one part of said outer wall of said central member and having a length adapted to locate said central member radially centrally in said cylindrical body when inserted with said central member through said opening, said rib having an upstream end in line with an upstream end of said central member; and
a mounting section connected to said rib and having a shape to close said opening and fixedly support said central member in said cylindrical body,
wherein said central member includes:
an inlet for introducing therethrough a part of a fluid flowing in said cylindrical body;
a bypass passage communicated with said inlet to flow said a part of fluid therethrough;
a sensing element disposed in said bypass passage to sense an amount of air flow of said fluid;
an outlet communicated with said bypass passage to discharge therethrough said a part of fluid into said cylindrical body, said outlet being formed circumferentially in a C-shape on said outer wall except for said one part,
wherein said outlet has two circumferential ends which cover said one part of said central member therebetween and generally correspond to said opening of said cylindrical body.

12. A thermal flow meter according to claim 11,
wherein said bypass passage includes:
a central passage extending from said inlet centrally in a direction of fluid flow; and
an outer passage generally surrounding said central passage and communicated with said central passage and said outlet.

13. A thermal flow meter according to claim 11,
wherein said bypass passage includes a step portion formed upstream said sensing element for reducing a flow area for said fluid part thereat.

14. A thermal flow meter as in claim 11, wherein only a single rib is connected to said central member, said single rib being provided at only a single radial location connected to only a single radial location of said central member and wherein an electronic circuit is provided within said single rib.

15. A thermal flow meter for use with a cylindrical body having a predetermined opening on a cylindrical wall thereof, said meter comprising:
a central member having an outer wall constructed to be inserted into said cylindrical body radially through said opening;
a rib connected to one part of said outer wall of said central member and having a length adapted to locate said central member radially centrally in said cylindrical body when inserted with said central member through said opening, said rib having an upstream end in line with an upstream end of said central member; and
a mounting section connected to said rib and having a shape to close said opening and fixedly support said central member in said cylindrical body,
wherein said central member includes:
an inlet for introducing therethrough a part of a fluid flowing in said cylindrical body;
a bypass passage communicated with said inlet to flow said a part of fluid therethrough;
a sensing element disposed in said bypass passage to sense an amount of air flow of said fluid;
an outlet communicated with said bypass passage to discharge therethrough said a part of fluid into said cylindrical body, said outlet being formed circumferentially in a C-shape on said outer wall except for said one part,
wherein said outlet is located between upstream and downstream ends of said rib,
wherein said passage includes:
a central passage extending from said inlet centrally in a direction of fluid flow; and
an outer passage generally surrounding said central passage and communicated with said central passage and said outlet,
wherein said outlet has two circumferential ends which cover said one part of said central member therebetween and generally correspond to said opening of said cylindrical body,
wherein said outlet is located between upstream and downstream ends of said rib.

16. A thermal flow meter according to claim 15,
wherein said central member has a diameter gradually increasing in an upstream to downstream direction; and
wherein said outlet is formed at a diameter increasing portion.

17. A thermal flow meter according to claim 15,
wherein said central passage includes a step portion which reduces a flow area for said fluid to part an upstream of said sensing element.

18. A thermal flow meter as in claim 15, wherein only a single rib is connected to said central member, said single rib being provided at only a single radial location connected to only a single radial location of said central member and wherein an electronic circuit is provided within said single rib.

19. A thermal flow meter comprising:
a cylindrical body forming a main passage through which a fluid passes and an opening on a wall thereof;
a central member insertable through said opening and positioned approximately at a radial center of said main passage;
a single rib connected to one part of said central member at one end thereof, said rib having an upstream end in axial alignment with an upstream end of said central member and wherein an electronic circuit is provided within said rib; and
a mounting section connected to an other end of said rib and mounted on said cylindrical body to close said opening,
wherein said central member includes:
an introduction inlet introducing thereinto a part of a fluid flowing in said main passage;
a bypass passage through which the fluid introduced through said introduction inlet flows;
a sensor disposed in said bypass passage for measuring a flow amount of the fluid in said bypass passage; and
an exit opened in a shape of a letter C on an outermost wall of said central member except for said one part to which said rib is connected for reverting the fluid flowing in said bypass passage to said main passage; and
wherein said exit is formed at a position between upstream and downstream ends of said rib.

* * * * *